May 20, 1969     T. J. GALLAGHER     3,445,273

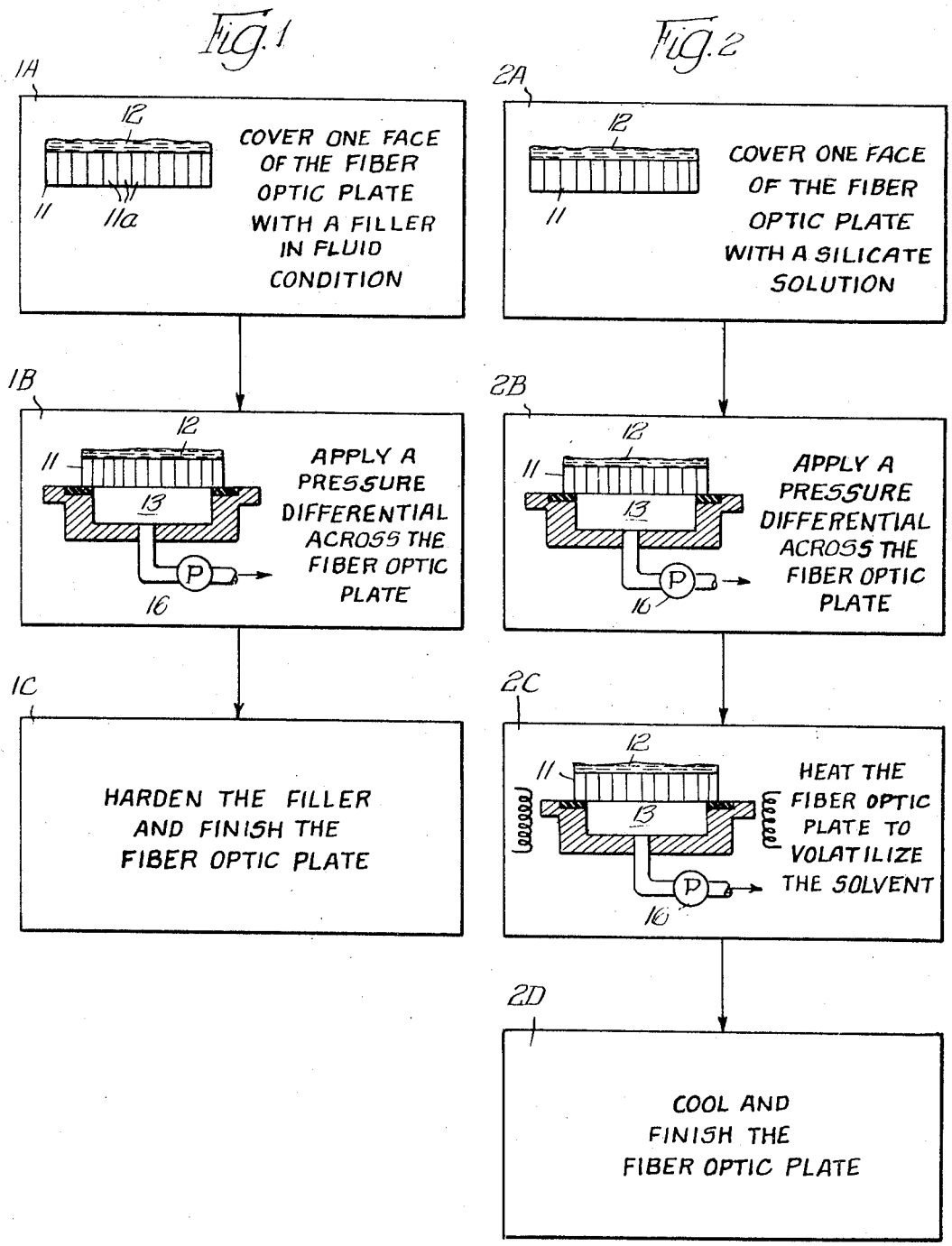

METHOD OF SEALING FIBER OPTIC DEVICES

Filed June 17, 1965     Sheet 2 of 2

Fig. 3

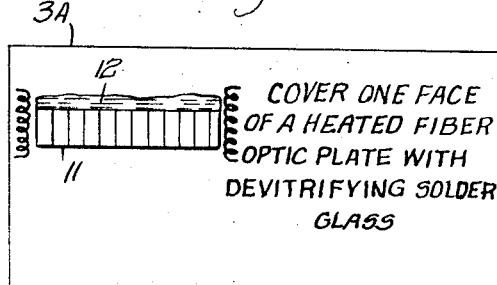

3A) COVER ONE FACE OF A HEATED FIBER OPTIC PLATE WITH DEVITRIFYING SOLDER GLASS

Fig. 4

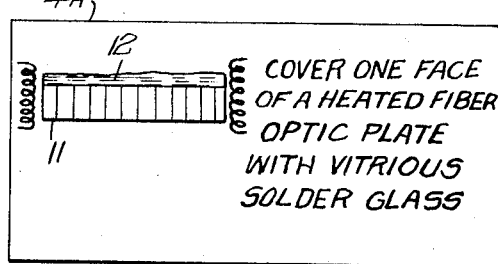

4A) COVER ONE FACE OF A HEATED FIBER OPTIC PLATE WITH VITRIOUS SOLDER GLASS

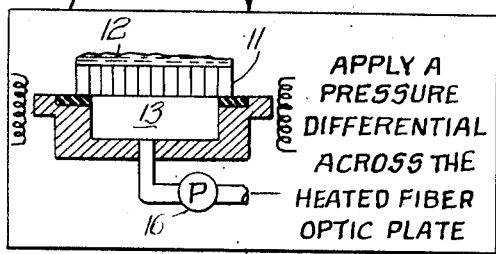

3B) APPLY A PRESSURE DIFFERENTIAL ACROSS THE HEATED FIBER OPTIC PLATE

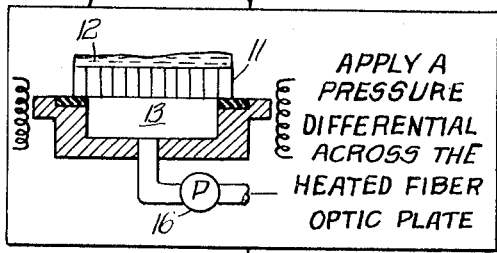

4B) APPLY A PRESSURE DIFFERENTIAL ACROSS THE HEATED FIBER OPTIC PLATE

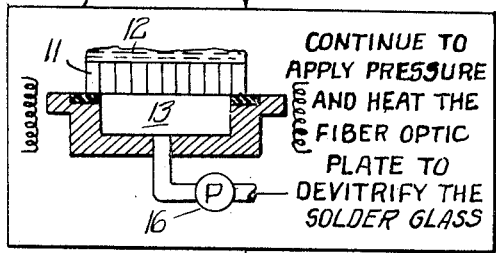

3C) CONTINUE TO APPLY PRESSURE AND HEAT THE FIBER OPTIC PLATE TO DEVITRIFY THE SOLDER GLASS

4C) COOL AND FINISH THE FIBER OPTIC PLATE

3D) COOL AND FINISH THE FIBER OPTIC PLATE

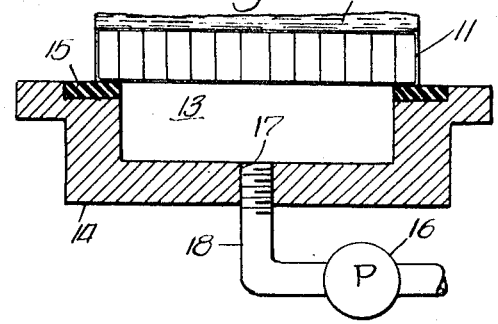

Fig. 5

Inventor:
Terence J. Gallagher,
By Hume, Groen, Clement & Hume
Attys

# United States Patent Office 3,445,273
Patented May 20, 1969

3,445,273
METHOD OF SEALING FIBER OPTIC DEVICES
Terence J. Gallagher, Mount Prospect, Ill., assignor, by mesne assignments, to Owens-Illinois, Inc., Toledo, Ohio, a corporation of Ohio
Filed June 17, 1965, Ser. No. 464,778
Int. Cl. C03c 25/02; C23c 13/00
U.S. Cl. 117—119                    3 Claims

ABSTRACT OF THE DISCLOSURE

A method for sealing voids and fissures penetrating through a fiber optic plate. One face of the fiber optic plate is covered with a filler in a fluid condiiton. A pressure differential is applied across the fiber optic plate so as to force a portion of the filler into the voids and fissures. The filler is then hardened to provide a sealing residue in said voids and fissures. A devitrifiable glass is used as the filler and is devitrified in situ.

---

This invention relates to glass fiber optic image transfer devices and, more particularly, to a method for sealing voids and fissures penetrating through the glass fiber optic plates in order to render the fiber optic plates suitable for application in cathode ray tubes or other related devices which require pressure tight plates.

Numerous examples exist in the prior art of cathode ray tubes embodying a viewing screen comprising a fiber optic plate. Among the earliest of such structures is that illustrated in U.S. Patent No. 2,354,591 granted to A. N. Goldsmith on July 25, 1944. A more recent structure of this type is illustrated in U.S. Patent No. 3,139,340 granted to F. J. Hays et al. on June 30, 1964. An excellent literature reference describing such use of fiber optic plates is the article entitled, "Fiber Optics, and Their Application in Electronic Tubes," which appears in the December 1961 issue of Electrical Design News.

Glass fiber optic plates are composed of a large number of individual glass fibers arranged in tightly-packed, mutually-parallel relationship. Typically, each of the individual glass fibers has a core formed of a glass having a high index of refraction surrounded by a sheath or cladding formed of a glass having a relatively low index of refraction so as to optically insulate the glass core fibers one from another.

To fabricate fiber optic plates, the individual fibers are normally grouped and fused in parallel relationship into elongate fiber bundles of selected size and cross-sectional configuration. The fiber bundles are then assembled and fused together in parallel relationship to form a unitary block with the optical fibers extending the length of the block. The block is then sawed transversely of the fibers to yield a number of plates, and the resultant fiber optic plates are ground and finished to place them in a form suitable for coherent image transfer.

Fiber optic plates manufactured according to conventional methods frequently contain fissures and voids penetrating through the plate, a condition which renders the plates incapable of hermetically retaining the partial vacuum required for cathode ray tube operation. These undesired fissures and voids may occur between the sheath and core interfaces in an individual optic fiber, between individual fibers in a fiber bundle, or between adjacent fiber bundles.

It is a primary object of the present invention to provide a method for sealing voids and fissures penetrating though a glass fiber optic plate.

It is another object of the present invention to provide a method for sealing such voids and fissures penetrating through a glass fiber optic plate with a material which will withstand temperatures of 900° F. and pressures up to 15 p.s.i.a. for several hours without being displaced from the voids or fissures.

It is a further object of the present invention to provide a simple and inexpensive method for sealing voids and fissures penetrating through a glass fiber optic plate.

It is a specific object of the present invention to provide a method for sealing voids and fissures penetrating through a fiber optic plate which includes the steps of applying a filler in liquid form to one face of the fiber optic plate, applying a pressure differential across the fiber optic plate to force the filler into the voids and fissures, and then hardening the filler.

These and other objects and features of the present invention will be better understood by reference to the following detailed description and to the accompanying drawings.

In the drawings:

FIGURE 1 is a diagrammatic illustration partly schematic and partly in block form, illustrating the general steps of the inventive method.

FIGURE 2 is a diagrammatic illustration, partly schematic and partly in block form, of another specific form of the inventive method illustrating the steps thereof.

FIGURE 3 is a diagrammatic illustration, partly schematic and partly in block form, of still another specific form of the inventive method illustrating the steps thereof.

FIGURE 4 is a diagrammatic illustration, partly schematic and partly in block form, of an additional specific form of the inventive method illustrating the steps thereof.

FIGURE 5 is a diagrammatic view partly in cross-section, of means for applying a pressure differential across the fiber optic plate.

Referring now to FIGURE 1, it is seen that the general steps of the inventive method include covering one face of the fiber optic plate 11 with a filler 12 in liquid form, as indicated by block 1A. The optic fibers 11A are shown in enlarged diagrammatic form to illustrate the direction of their orientation in the fiber optic plate 11. By "liquid form" it is meant that the filler 12 may be in molten condition or in solution. Further, since the voids and fissures to be filled are normally less than 1 micron in diameter, the filler 12 in liquid form should preferably have a relatively low surface tension and viscosity so as to be capable of entering voids and fissures of such small size. Specific types of fillers will be described further on.

A portion of the liquid filler 12 is drawn into the voids and fissures by applying a pressure differential across the fiber optic plate 11, as indicated by block 1B. For this purpose, the fiber optic plate 11 is mounted over a vacuum chamber 13 formed by a casing 14, as best illustrated in FIGURE 5. As shown, the edges of the fiber optic plate 11 rest on a gasket 15. The chamber 13 is evacuated by a conventional pneumatic pump 16 which is connected to the port 17 of chamber 13 by a conduit 18, and which exhausts to the atmosphere. By evacuating the chamber 13, a pressure differential of approximately 15 p.s.i. is applied across the fiber optic plate 11, forcing some of the liquid filler 12 into the voids and fissures, as previously mentioned.

The filler 12 is now hardened to seal the undesired voids and fissures which penetrate through the fiber optic plate 11, as indicated by block 1C. The manner in which the filler 12 is hardened will depend on the nature of the filler 12. For example, if the initial condition of the filler 12 is that of a molten condition, it may be hardened by cooling the filler 12 to room temperature. On the other hand, if the initial condition of the filler 12 is that of soluble material carried in a solvent, the hardening will generally consist of heating the fiber optic plate to volatilize or evaporate the solvent in order to deposit the soluble material.

The sealed fiber optic plate 11 is then optically finished to place it in condition for application to a cathode ray tube. This will generally include grinding one of the faces to a curvature compatible with the electron beam focal plane of the cathode ray tube and grinding the edge portions of the fiber optic plate 11 to the proper dimensions. It should be noted that it is contemplated that the edge grinding will include grinding off the areas of the plate 11 which overlap the gasket 15 and which were not exposed to the vacuum created in the chamber 13. However, the overlap can be avoided, if desired, by mounting the fiber optic plate 11 over the chamber 13 in another suitable manner.

Referring now to FIGURE 2, there is illustrated one form of the invention utilizing a silicate solution as the filler 12. The silicate solution is typically one capable of depositing a potassium or sodium silicate upon hardening by volatilization of the solvent.

Good results have been obtained using a silicate solution which consists of a 10% by volume solution in water of one part potassium oxide to two parts silicon dioxide. A surface tension reducing agent is preferably added to this solution to enhance the capability of the solution for wetting the fiber optic glass and entering the very small diameter voids and fissures which may be present in the fiber optic plate 11. For example, a surfactant in the amount of 0.1% by volume will reduce the surface tension of the water solution from approximately 72 dynes per centimeter to approximately 15 dynes per centimeter at a temperature of 20° C.

It should be noted that solvents other than water may be used to carry the silicate solution. An alcohol, for example, might be used as the solvent with the advantages of greater volatility and lower surface tension than water. With the silicate solution applied to one face of the fiber optic plate 1, as indicated by block 2A, the pneumatic pump 16 is energized to evacuate the chamber 13 and force the silicate solution into the voids and fissures to be sealed, as indicated by block 2B.

The pressure differential is then removed, and the fiber optic plate 11 is heated to a suitable temperature which is lower than the softening point of the fiber optic glass and preferably lower than the boiling point of the solvent. The application of heat hardens the filler by volatilizing the solvent and depositing a silicate, as indicated by bloc 2C. The heating may be accomplished in a suitable furnace in which the casing 14 is emplaced.

Upon completion of volatilization of the solvent, the fiber optic plate 11 is cooled to room temperature and then finished by grinding and polishing in the manner previously described.

It has been found that the silicate sealer deposited in the voids and fissures normally will not be dislodged by the 900° F. temperature and 15 p.s.i. pressure differential to which the fiber optic plate 11 is subjected during manufacture of the cathode ray tube.

Referring now to FIGURE 3, there is shown another form of the inventive method in which the filler 12 consists of devitrifying solder glass. One useful devitrifying solder glass is produced by Corning Glass Works under the trademark designation Pyroceram 89. Another is produced by Owens-Illinois, Inc. under the trademark designation CV 97.

As indicated by block 3A, the fiber optic plate is heated in a furnace, or the like, to the melting temperature of the devitrifying solder glass, typically 825° F. Preferably, the fiber optic plate is heated prior to application of the devitrifying solder glass, although the heating may be initiated after application of the devitrifying solder glass, if desired.

The devitrifying solder glass is applied to cover the exposed face of the fiber optic plate 11, as illustrated somewhat diagrammaticaly at 12 in block 3A. The devitrifying solder glass may be applied in powder form and melted on the heated fiber optic plate 11. However, to facilitate complete coverage of the face of the fiber optic plate by the solder glass, the solder glass may be applied in molten form, or powdered and carried in a volatile liquid vehicle such as amyl acetate. In the latter case, the liquid vehicle is volatilized as the solder glass is melted on the fiber optic plate.

The molten devitrifying solder glass is then forced into the voids and fissures by the application of a pressure differential across the fiber optic plate 11, as indicated in block 3B. The pressure differential is held while the fiber optic plate 11 continues to be heated for a suitable period of time, typically one hour, to harden the molten solder glass by devitrifying the solder glass, as indicated in block 3C.

Finally, the fiber optic plate 11 is cooled to room temperature and finished. It should be noted that in this form of the inventive method, the melted devitrifying solder glass will normally have a higher surface tension and viscosity than the fluid filler previously described. Therefore, the solder glass will not flow readily into the voids and fissures. Accordingly, care should be taken in finishing the fiber optic plate 11 not to exceed the shallow depth in which the solder glass is present in the voids and fissures.

Referring now to FIGURE 4, an additional form of the inventive method is illustrated in which the exposed face of the fiber optic plate 11 is covered with a filler 12 consisting of a low melting point glass, such as vitreous solder glass as indicated in block 4A. Commercially available high lead solder glasses, useful in practicing this form of the inventive method, include vitreous solder glasses such as produced by Corning Glass Works, under the trademark designation 7570, and by Owens-Illinois, Inc. under the trademark designation SG-67, and by Schott Glass under the trademark designations 8462 and 8461. The fiber optic plate 11 is compatibly heated to the melting temperature of the solder glass, which must be lower than the softening point of the fiber optic glass. As in the form of the inventive method shown in FIGURE 3, wherein the solder glass may be melted either on the heated fiber optic plate 11 or prior to application thereto, in the form of the invention shown in FIGURE 4, also, the solder glass may be applied in powdered form and melted on the heated fiber optic plate 11. To facilitate complete coverage of the face of the fiber optic plate 11, however, it is preferable to apply the solder glass initially in molten condition, or powered and carried in a volatile liquid vehicle such as amyl acetate. In the latter case, the liquid vehicle is volatilized as the solder glass is molted on the fiber optic plate 11.

A pressure differential is next applied across the heated fiber optic plate 11 to force the molten vitreous solder glass into the voids and fissures to be sealed, as indicated in block 4B, and the fiber optic plate 11 is then cooled to room temperature and finished. As in the FIGURE 3 form of the inventive method, care must be taken in finishing the fiber optic plate not to unseal the voids and fissures, since the viscosity of the melted solder glass will limit the depth to which it will be forced into the voids and fissures in a given period of time. Further, the fiber optic plate should preferably be mounted on the cathode ray tube with the face to which the vitreous solder glass was applied facing outwardly such that the vitreous solder glass in the voids and fissures will be forced further into the fiber optic plate 11 during the time in which the fiber optic plate is subject to the 900° F. temperature and 15 p.s.i. pressure differential encountered in cathode ray tube manufacture.

The vitreous solder glass used in the FIGURE 4 form of the inventive method will be liquid at the 900° F. temperature experienced by the fiber optic plate 11 during manufacture of the cathode ray tube. However, the viscosity and surface tension of the solder glass sealant are sufficiently high that the solder glass will be retained in the capillary-size voids and fissures for several hours at 900° F., even under a pressure differential of 15 p.s.i. in a direction tending to displace the sealant.

What is claimed is:

1. A method for sealing voids and fissures penetrating through a glass fiber optic plate comprising the steps of: heating said fiber optic plate; covering one face of said heated fiber optic plate with molten devitrifying solder glass; applying a pressure differential across said heated fiber optic plate to force a portion of said molten devitrifying solder glass into said voids and fissures, continuing to heat said fiber optic plate for a period of time sufficient to devitrify said devitrifying solder glass to provide a sealing residue in said voids and fissures; and cooling said fiber optic plate.

2. A method for sealing voids and fissures penetrating through a glass fiber optic plate comprising the steps of: applying to one face of said fiber optic plate a powdered devitrifying solder glass carried in a volatile liquid vehicle; heating said fiber optic plate to volatilize said liquid vehicle and melt said devitrifying solder glass; applying a pressure differential across said fiber optic plate so as to force said molten devitrifying solder glass into said voids and fissures; continuing to heat said fiber optic plate so as to devitrify said devitrifying solder glass to provide a sealing residue in said voids and fissures; and cooling said fiber optic plate.

3. The method defined in claim 2 wherein said liquid vehicle is amyl acetate.

References Cited

UNITED STATES PATENTS

| 2,951,773 | 9/1960 | Helle et al. | |
| 3,114,668 | 12/1963 | Guiles. | |
| 3,279,902 | 10/1966 | Gardner | 350—96 |
| 3,279,942 | 10/1966 | Granitsas et al. | |
| 3,379,558 | 4/1968 | Upton. | |

ALFRED L. LEAVITT, *Primary Examiner.*

J. A. BELL, *Assistant Examiner.*

U.S. Cl. X.R.

65—4, 33; 117—123, 124, 125, 126; 350—96